(12) United States Patent
Williams (10) Patent No.: US 12,465,044 B2
(45) Date of Patent: Nov. 11, 2025

(54) SOUND SELECTABLE GAME CALLS

(71) Applicant: R. Keith Williams, El Dorado, AR (US)

(72) Inventor: R. Keith Williams, El Dorado, AR (US)

( * ) Notice: Subject to any disclaimer, the term of this patent is extended or adjusted under 35 U.S.C. 154(b) by 0 days.

(21) Appl. No.: 18/595,958

(22) Filed: Mar. 5, 2024

(65) Prior Publication Data

US 2024/0341297 A1 Oct. 17, 2024

Related U.S. Application Data

(60) Provisional application No. 63/577,268, filed on Apr. 13, 2023.

(51) Int. Cl.
*A01M 31/00* (2006.01)
(52) U.S. Cl.
CPC .................... *A01M 31/004* (2013.01)
(58) Field of Classification Search
CPC ...................................... A01M 31/004
USPC .......................................... 446/397
See application file for complete search history.

(56) References Cited

U.S. PATENT DOCUMENTS

| | | | | | |
|---|---|---|---|---|---|
| 3,100,948 | A | * | 8/1963 | Tax | A01M 31/004 43/2 |
| 4,422,262 | A | * | 12/1983 | Moss | A63H 5/00 446/397 |
| 4,846,753 | A | * | 7/1989 | Langston | A01M 31/004 446/397 |
| 4,941,858 | A | * | 7/1990 | Adams | A01M 31/004 446/397 |
| 5,380,235 | A | * | 1/1995 | Forbes | A01M 31/004 446/397 |
| 5,830,036 | A | * | 11/1998 | Richardson | A01M 31/004 446/397 |
| 6,149,493 | A | * | 11/2000 | Long | A01M 31/004 446/397 |
| 6,168,493 | B1 | * | 1/2001 | Kirby | A01M 31/004 446/397 |
| 7,347,762 | B1 | * | 3/2008 | Long | A01M 31/004 446/397 |
| 2007/0184752 | A1 | * | 8/2007 | Zearing | A01M 31/004 446/418 |
| 2010/0178843 | A1 | * | 7/2010 | Peel | A01M 31/004 446/397 |
| 2011/0070806 | A1 | * | 3/2011 | Burcham | A01M 31/004 446/397 |
| 2015/0335008 | A1 | * | 11/2015 | Steinmetz | A01M 31/004 446/397 |

(Continued)

*Primary Examiner* — Christopher D Hutchens
(74) *Attorney, Agent, or Firm* — R. Keith Harrison (57) ABSTRACT

Sound selectable game calls may include a call frame. The call frame may include side frame panels. At least one frame spacer may be disposed between the side frame panels. At least one of the side frame panels may engage the frame spacer or spacers. At least one panel tension adjustment mechanism may engage the side frame panel or panels. The panel tension adjustment mechanism may be configured to adjust engagement tension of the corresponding side frame panel against the frame spacer or spacers. A call paddle may be pivotally supported by the call frame. The call paddle may be configured for contact with and scraping movement across the side frame panel or panels for production of the game call sounds.

20 Claims, 9 Drawing Sheets

(56) References Cited

U.S. PATENT DOCUMENTS

2018/0049428 A1* 2/2018 Burcham ............ A01M 31/004

* cited by examiner

SOUND SELECTABLE GAME CALLS

CROSS-REFERENCE TO RELATED APPLICATIONS

This application claims the benefit of U.S. provisional application No. 63/577,268, filed Apr. 13, 2023, and entitled BOX CALL, which provisional application is hereby incorporated by reference herein in its entirety.

FIELD

Illustrative embodiments of the disclosure relate to wild game calls. More particularly, illustrative embodiments of the disclosure relate to box-type sound selectable game calls which can be adjusted to select the pitch, tone, quality and/or other characteristics of game call sounds in attracting turkeys and/or other wild game.

SUMMARY

Illustrative embodiments of the disclosure may include sound selectable game calls which can be adjusted to select the pitch, tone, quality and/or other characteristics of game call sounds in attracting wild game. An illustrative embodiment of the sound selectable game calls may include a call frame. The call frame may include a first side frame panel and a second side frame panel disposed adjacent and spaced-apart with respect to the first side frame panel. At least one frame spacer may be disposed between the first side frame panel and the second side frame panel. At least one of the first side frame panel and the second side frame panel may engage at least one frame spacer. At least one panel tension adjustment mechanism may engage the first side frame panel and/or the second side frame panel. The panel tension adjustment mechanism may be configured to adjust engagement tension of the corresponding first side frame panel and/or second side frame panel against the frame spacer or spacers. A call paddle may be pivotally supported by the call frame. The call paddle may be configured for contact with and scraping movement across the first side frame panel and/or the second side frame panel for production of the game call sounds.

BRIEF DESCRIPTION OF THE DRAWINGS

Illustrative embodiments of the disclosure will now be described, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the subject matter as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

All methods set forth in the present disclosure may be performed in any suitable order of steps unless otherwise indicated herein or contradicted by the rules of logic. The use of any and all examples or exemplary language provided herein is intended to clearly describe the subject matter of the disclosure and is not intended to be limiting on the scope of the subject matter set forth in the claims. No element, step, ingredient, or limitation mentioned or described in the specification shall not be construed as regarding any unclaimed component, step, or limitation to be essential in practicing the claimed subject matter.

Unless expressly or implicitly indicated otherwise, throughout the description and the appended claims, the terms "comprise", "comprising", "comprised of" and the like are to be construed in an inclusive sense as opposed to an exclusive or exhaustive sense, and are equivalent to the phrase, "including but not limited to". Each embodiment disclosed herein can comprise, consist essentially of, or consist of its particular stated element, step, ingredient, or limitation. As used herein, the transition terms "comprise", "comprises", "comprising", "include", "includes", "including", "is", "has", "having" or the like means "includes, but is not limited to, and allows for the inclusion of unspecified elements, steps, ingredients, or limitations, even in major amounts". The transitional phrase "consisting of" excludes any element, step, ingredient, or limitation not specified. The transition phrase "consisting essentially of" shall limit the scope of the embodiment to the specified elements, steps, ingredients, or limitations and to those that do not materially affect the embodiment.

Unless otherwise noted using precise or limiting terminology, all numbers which express quantities of ingredients throughout the specification and claims are to be understood as being approximations of the numerical value cited to express the quantities of those ingredients. As used throughout the specification and claims, the term "about" has the meaning reasonably ascribed to it by a person skilled in the art when used in conjunction with a stated numerical value or range, i.e., denoting from the exact stated value or range to somewhat more or somewhat less than the stated value or range, from a deviation of from 0% with respect to the stated value or range to up to and including 20% of the stated value or range in either direction.

Various illustrative embodiments of the disclosure are described herein. Variations on the described illustrative embodiments may become apparent to those of ordinary skill in the art in reading the specification, drawings and claims of the disclosure. Accordingly, the disclosure encompassed by the specification, claims and drawings includes all modifications and equivalents of the subject matter recited in the claims as permitted by applicable law. Additionally, any combination of the elements in all possible variations thereof is encompassed by the subject matter of the disclosure unless otherwise indicated herein.

Illustrative embodiments of the disclosure are directed to box-type sound selectable game calls which can be adjusted to select the tone and quality of game call sounds in attracting turkeys and/or other wild game.

Referring to the drawings, an illustrative embodiment of the sound selectable game calls is generally indicated by reference number 1. The sound selectable game call 1 may include a call frame 8. The call frame 8 may include a pair of side frame panels 20 disposed in adjacent and spaced-apart relationship with respect to each other. As particularly illustrated in FIGS. 2 and 9, at least one frame spacer 12 may be disposed between the side frame panels 20. At least one of the side frame panels 20 may engage the frame spacer 12. At least one panel tension adjustment mechanism 29 may engage the side frame panel or panels 20. The panel tension adjustment mechanism 29 may be configured to adjust engagement tension of the side frame panel 20 in physical contact engagement against the frame spacer 12. In some embodiments, the panel tension adjustment mechanism 29 may detachably attach each side frame panel 20 to the call frame 8, typically as will be hereinafter described. A call paddle 34 may be pivotally supported by the call frame 8. The call paddle 34 may be configured for contact with and scraping movement across one or both of the side frame panels 20 for production of game call sounds. The panel tension adjustment mechanism or mechanisms 29 may be selectively adjusted to correspondingly adjust the pitch, tone, quality and/or other characteristics of the game call sounds generated by the call paddle 34 as the call paddle 34 is scraped against the side frame panel or panels 20.

As illustrated in FIGS. 1, 2 and 4-8, in some embodiments, the call frame 8 of the sound selectable game call 1 may include a frame base 2. The frame base 2 of the call frame 8 may be elongated with a front base end 3; a rear base end 4; a pair of elongated, parallel base side edges 5; and an upper base surface 6. The frame spacer 12 may be attached to the upper base surface 6 of the frame base 2. In some embodiments, the frame base 2 may include at least one of a front frame wall 10 and a rear frame wall 11. The front frame wall 10 and/or the rear frame wall 11 may extend from the upper base surface 6 at or adjacent to the respective front base end 3 and/or rear base end 4. The panel tension adjustment mechanisms 29 may attach the respective side frame panels 20 to at least one of the front frame wall 10 and the rear frame wall 11. The side frame panels 20 may extend in parallel, adjacent and spaced-apart relationship with respect to each other along the respective base side edges 5 of the frame base 2. In some embodiments, the call frame 8 may include, consist essentially of, or consist of at least one of the front frame wall 10 and the rear frame wall 11 with at least one frame spacer 12.

Figure 2:
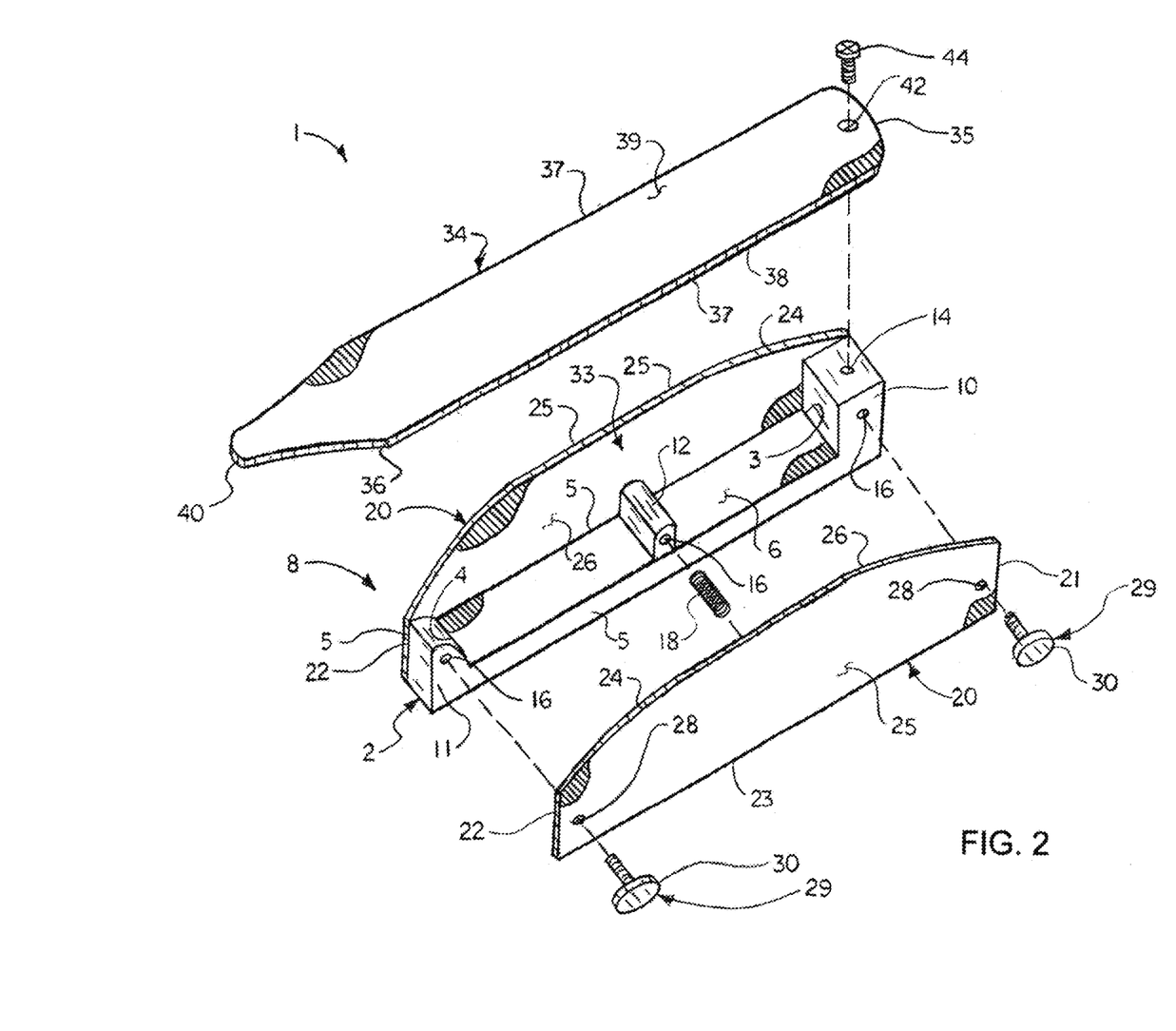
FIG. 2 is an exploded top rear perspective view of an illustrative embodiment of the sound selectable game calls.

As further illustrated in FIG. 2, each side frame panel 20 of the call frame 8 may have a front panel edge 21, a rear panel edge 22, a lower panel edge 23, an upper panel edge 24, an outer panel surface 25 and an inner panel surface 26. In the assembled call frame 8, the lower panel edge 23 may extend along or parallel or adjacent to each corresponding base side edge 5 of the frame base 2. The front panel edge 21 and the rear panel edge 22 of each side frame panel 20 may terminate at the respective front base end 3 and rear base end 4 of the frame base 2. As illustrated in FIGS. 10, 11, 16 and 17, the inner panel surface 26 of each side frame panel 20 may face the front frame wall 10, the rear frame wall 11 and the frame spacer 12. In some embodiments, the frame spacer 12 may be glued, mechanically fastened and/or otherwise attached to the upper base surface 6 of the frame base 2 typically according to the knowledge of those skilled in the art.

Figures 9, 10, 11:
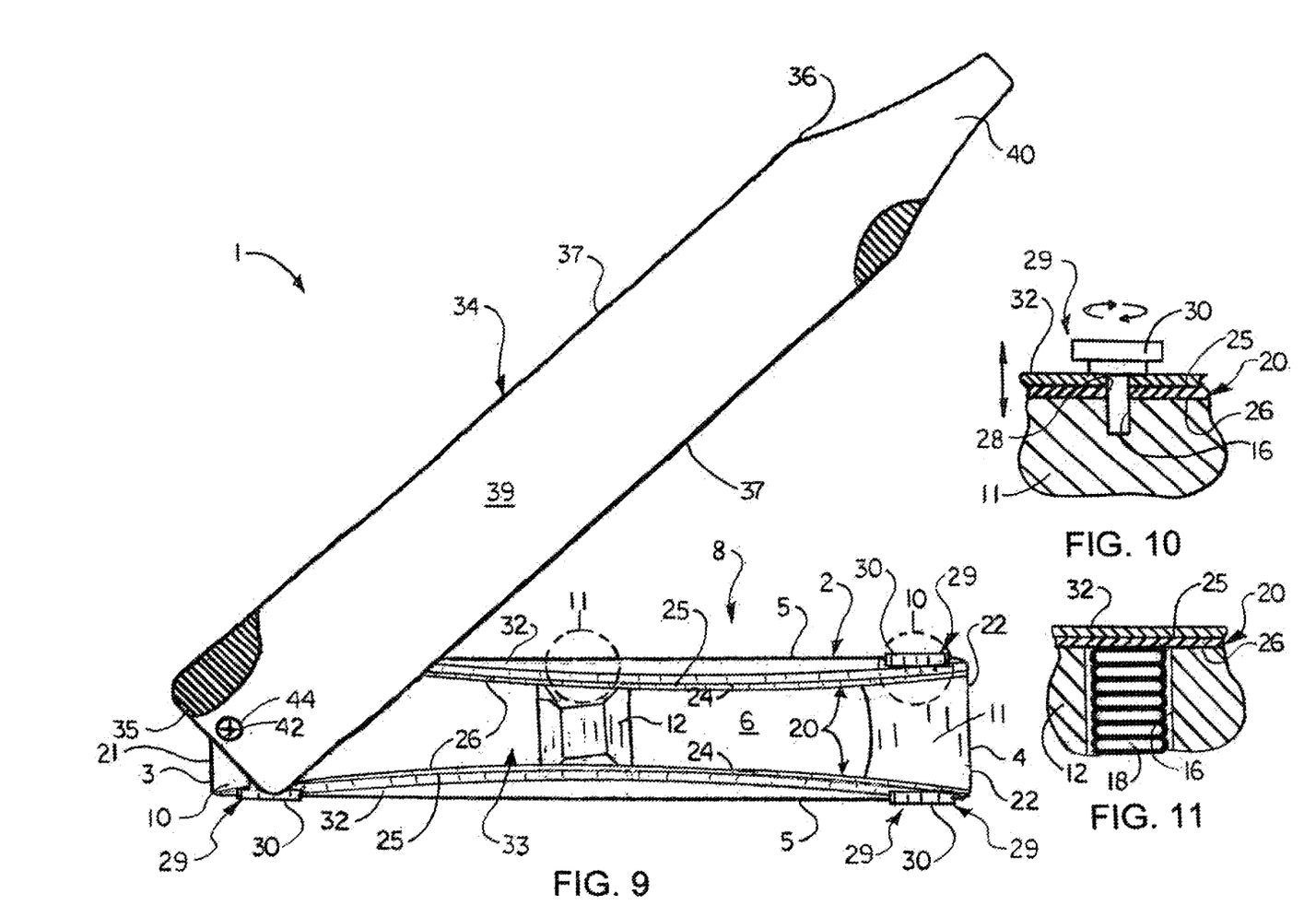
FIG. 9 is a top view of the illustrative sound selectable game call, with the call paddle pivoted to an angled sideways position relative to the call frame in production of game call sounds in typical application of the game call.
FIG. 10 is an enlarged sectional view, taken at section line 10 in FIG. 9.
FIG. 11 is an enlarged sectional view, taken at section line 11 in FIG. 9.
Figure 12:
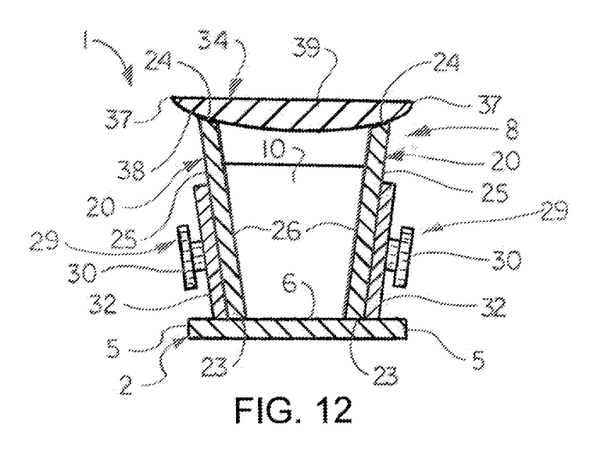
FIG. 12 is a cross-sectional view, taken along section lines 12-12 in FIG. 3, of the illustrative sound selectable game call.

As illustrated in FIGS. 2 and 9, a frame interior 33 may be formed by and between the frame base 2 and the side frame panels 20. The front frame wall 10 may be disposed in the frame interior 33 between the side frame panels 20 at the front base end 3 of the frame base 2. The rear frame wall 11 may be disposed in the frame interior 33 between the side frame panels 20 at the rear base end 4 of the frame base 2. The frame spacer 12 may be disposed in the frame interior 33 between the side frame panels 20 and between the front frame wall 10 and the rear frame wall 11. The side frame panels 20 may engage the front frame wall 10, the rear frame wall 11 and the frame spacer 12. The front frame wall 10, the rear frame wall 11 and the frame spacer 12 may be pressed and/or otherwise secured in the frame interior 33 typically according to the knowledge of those skilled in the art. In some embodiments, the front frame wall 10, the rear frame wall 11 and the frame spacer 12 may be glued, mechanically fastened and/or otherwise attached to the upper base surface 6 of the frame base 2 typically according to the knowledge of those skilled in the art, as was heretofore described. In some embodiments, the front frame wall 10, the rear frame wall 11 and/or the frame spacer 12 may be cut, carved, shaped, formed, molded and/or otherwise provided in a single unitary piece with the upper base surface 6 of the frame base 2 typically according to the knowledge of those skilled in the art.

Figure 15:
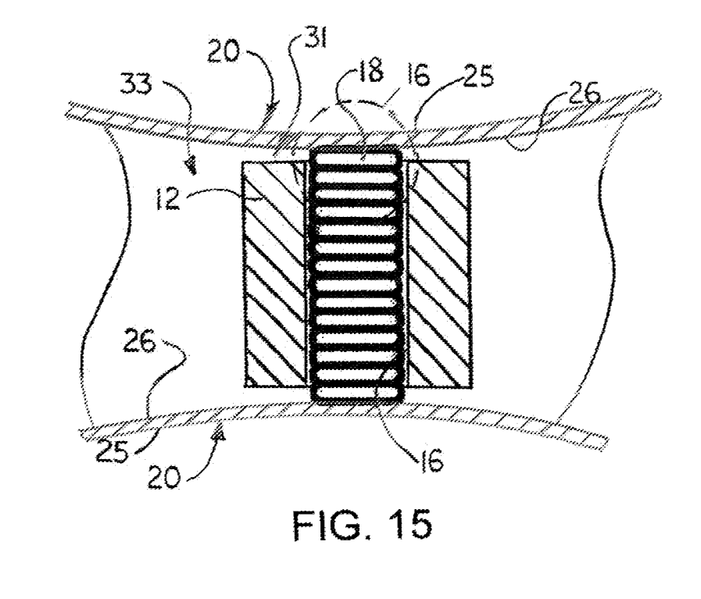
FIG. 15 is a horizontal sectional view of the center wall spacer, the spacer spring disposed in a spring opening in the center wall spacer and the side frame panels engaging the spacer spring.
Figure 16:
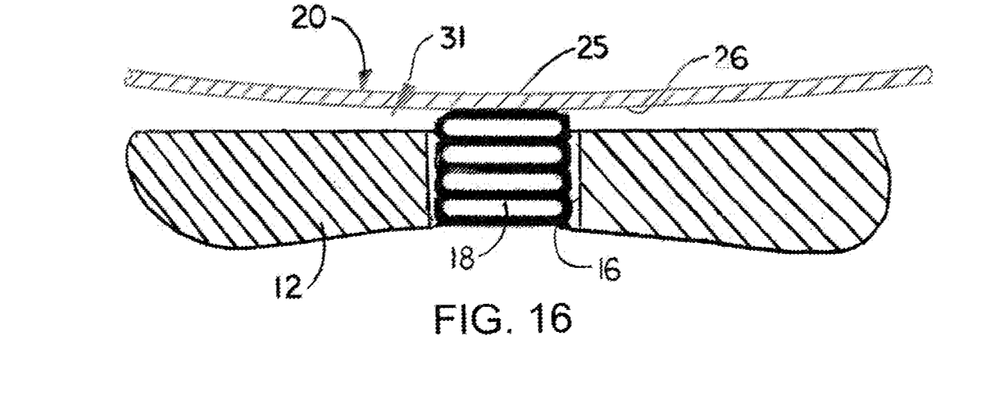
FIG. 16 is an enlarged sectional view, taken at section line 16 in FIG. 15, with the side frame panel in an inwardly bowed spring configuration relative to the center frame spacer of the call frame to produce game call sounds having selected characteristics.

As illustrated in FIGS. 9 and 15-17, in some embodiments, each side frame panel 20 may normally be bowed inwardly with respect to the frame spacer 12 in a spring configuration to impart a slight spring action to the side frame panel 20 in a loosened state of the panel tension adjustment mechanism or mechanisms 29. Accordingly, in a loose adjustment of the panel tension adjustment mechanism 29, as illustrated in FIG. 16, the side frame panel 20 may at least partially disengage the frame spacer 12, with a panel gap 31 between at least a portion or segment of the side frame panel 20 and the frame spacer 12. In a medium adjustment of the panel tension adjustment mechanism 29, as illustrated in FIG. 16, the panel gap 31 may shorten and/or narrow relative to that of the loose adjustment in FIG. 16. In a tight adjustment of the panel tension adjustment mechanism 29, as illustrated in FIGS. 10 and 11, the panel gap 31 may substantially or completely be eliminated as the side frame panel 20 engages the substantially entire surface of the frame spacer 12. The inwardly bowed spring action of the side frame panel or panels 20 may be achieved by appropriately shaping the frame base 2 and/or shaping or warping each side frame panel 20 typically according to the knowledge of those skilled in the art.

Each panel tension adjustment mechanism 29 may be configured to engage each corresponding side frame panel 20 into physical contact engagement against the frame spacer 12 at a selected engagement tension. Accordingly, each panel tension adjustment mechanism 29 may be configured to adjust the engagement tension of each corresponding side frame panel 20 against the frame spacer 12. Each panel tension adjustment mechanism 29 may include any type of mechanism, device, element, component or combination thereof which is suitable for adjusting the engagement tension of each side frame panel 20 against the frame spacer 12. In some embodiments, each panel tension adjustment mechanism 29 may be configured to detachably fasten or attach each side frame panel 20 to the front frame wall 10 and/or the rear frame wall 11 of the frame base 2. For example and without limitation, in some embodiments, each panel tension adjustment mechanism 29 may include at least one thumb screw 30. As illustrated in FIG. 2, each thumb screw 30 may extend through a thumb screw opening 28 in the side frame panel 20 and threaded into a corresponding registering thumb screw cavity 16 in the corresponding front frame wall 10 and/or rear frame wall 11. Each thumb screw 30 may be rotated typically counterclockwise to loosen and typically clockwise to tighten the engagement tension of the side frame panel 20 against the frame spacer 12. In other embodiments, each panel tension adjustment mechanism 29 may additionally or alternatively include brackets, clips, clamps and/or other mechanical fasteners which may be suitable for the purpose of selectively adjusting the engagement tension. Removability of the side frame panels 20 to the front frame wall 10 and/or the rear frame wall 11 of the frame base 2 may enhance tunability of the sound selectable game call 1.

Figure 17:
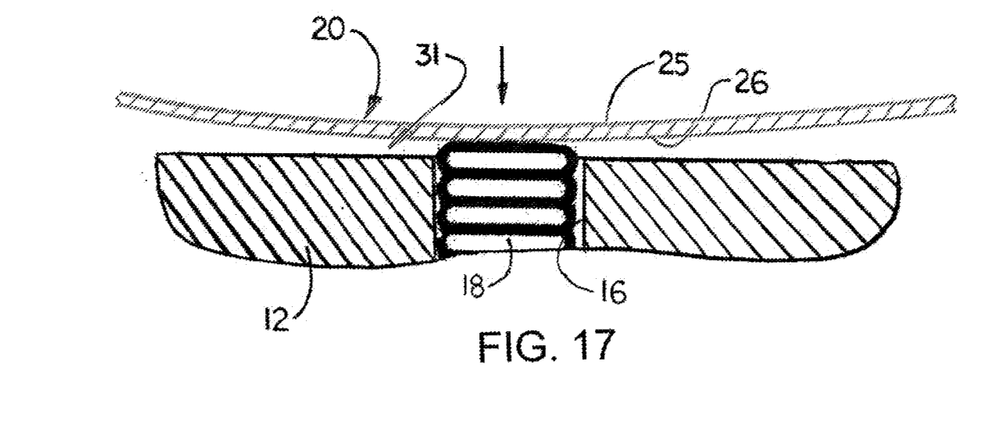
FIG. 17 is an enlarged sectional view, taken at section line 16 in FIG. 15, with the side frame panel deformed towards the center frame spacer of the call frame to produce game call sounds having different selected characteristics.

As illustrated in FIGS. 2 and 15-17, in some embodiments, at least one spring opening 16 may be provided in the frame spacer 12. The spring opening 16 may be oriented transvers to a longitudinal axis of the frame base 2. At least one spacer spring 18 may be disposed in the spring opening 16. The spacer spring 18 may extend or protrude from the spring opening 16 beyond the plane of the frame spacer 12. Accordingly, as illustrated in FIGS. 15-17, at least one of the side frame panels 20 may engage the spacer spring 18. The panel tension adjustment mechanism or mechanisms 29 may be tightened or loosened to adjust the engagement tension of the corresponding side frame panel or panels 20 against the spacer spring 18. The spacer spring 18 may thus apply biasing spring pressure against the inner panel surface 26 of each corresponding side frame panel 20 which is opposite in direction to the engagement tension applied by the panel tension adjustment mechanism or mechanisms 29 against the side frame panel or panels 20. The spring pressure applied to the side frame panel or panels 20 in combination with the engagement tension applied by the panel tension adjustment mechanism or mechanisms 29 may further enhance the quality of the call sounds produced by the sound selectable game call 1. In some embodiments, the inward tension of each side frame panel 20 and the outward tension imparted by the spacer spring 18 against the side frame panel 20 may work together to aid in the tunability of the sound selectable game call 1. In some embodiments, the spacer spring 18 may be removably disposed in the spring opening 16 to facilitate interchangeable deployment of spacer springs 18 having various tensions in the spring opening 16. The spacer springs 18 having different tensions may vary the pitch, tone, quality and/or other characteristics of the game call sounds produced by the sound selectable game call 1. For example, a stronger spacer spring 18 may create a different sound than a weaker spacer spring 18 in the same sound selectable game call 1.

As illustrated in FIG. 15, in some embodiments, the spring opening 18 may extend completely through the width of the frame spacer 12 and may protrude beyond the opposite side surfaces of the frame spacer 12, as illustrated. Accordingly, the side frame panels 20 may engage the opposite ends of the spacer spring 18. In some embodiments, the side frame panels 20 may engage separate spacer springs 18 which may be seated in their respective spring cavities or openings 16 in the frame spacer 12.

As illustrated in FIGS. 1 and 5-7, in some embodiments, at least one veneer panel 32 may be provided on the outer panel surface 25 of each side frame panel 20. The veneer panel 32 may cover the entire outer panel surface 25 or a selected portion or portions of the outer panel surface 25. In some embodiments, one or more decorative patterns may be cut and/or otherwise provided in the veneer panel 32 to enhance the overall aesthetic appearance of the sound selectable game call 1. As illustrated in FIG. 10, in some embodiments, each thumb screw 30 of the panel tension adjustment mechanism 29 may extend through registering thumb screw openings 28 which may extend through both the veneer panel 32 and the adjacent side frame panel 20, or alternatively, through the side frame panel 20, as illustrated in FIGS. 16 and 17.

Figure 1:
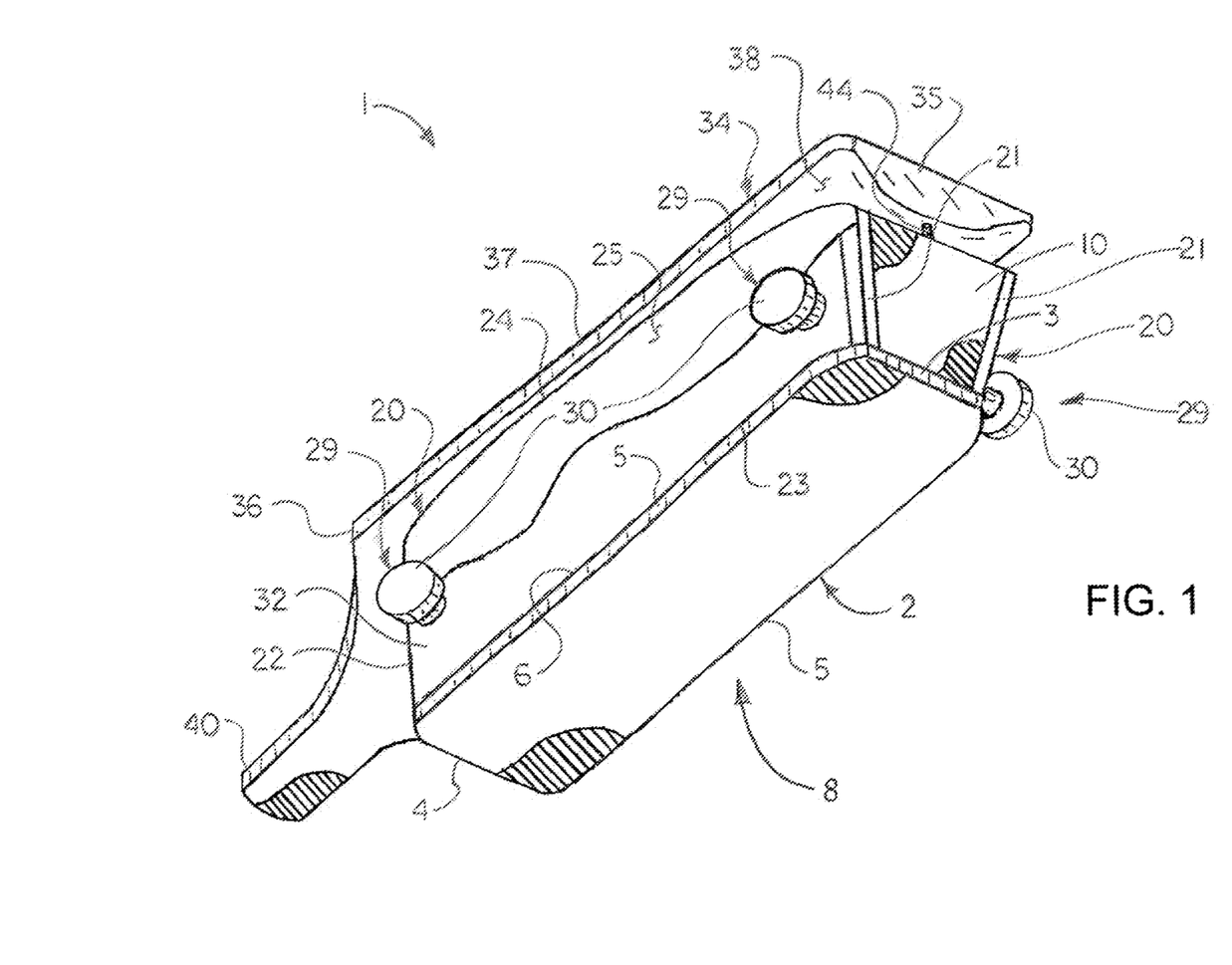
FIG. 1 is a bottom front perspective view of an illustrative embodiment of the sound selectable game calls.
Figure 3:
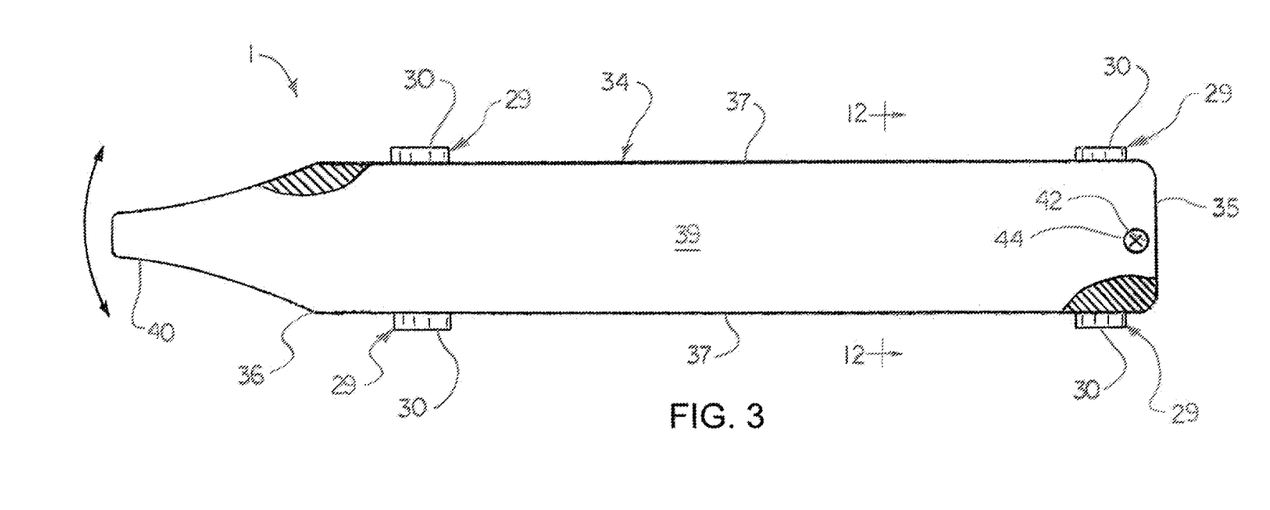
FIG. 3 is a top view of the illustrative sound selectable game call with the call paddle disposed in an aligned, registering or parallel position relative to the call frame (not illustrated) of the game call.
Figure 4:
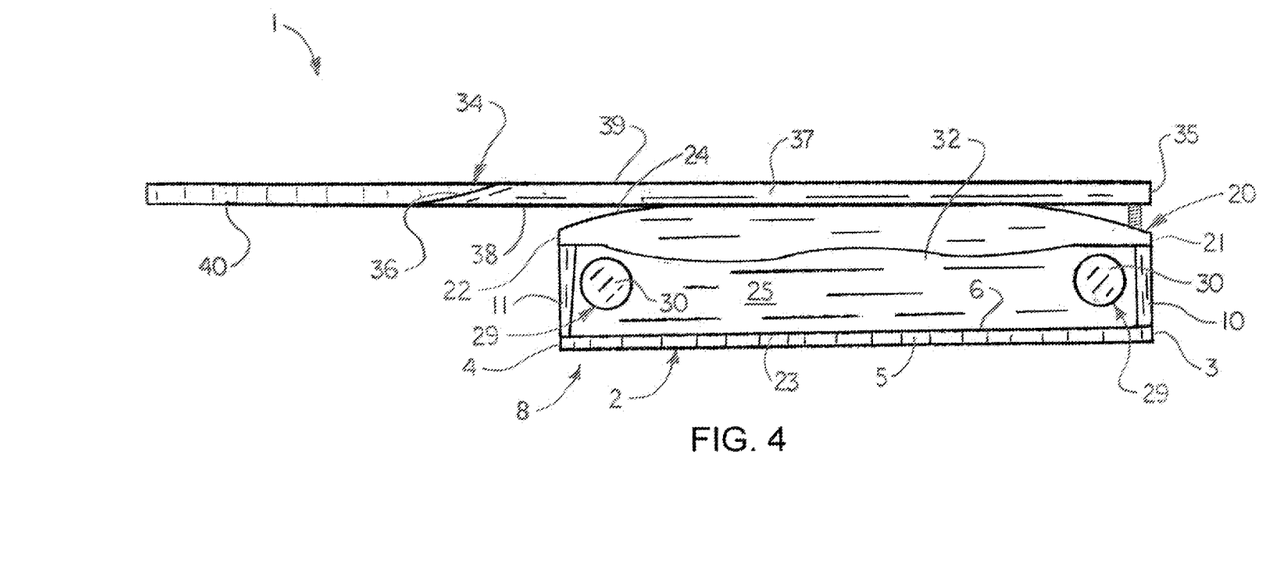
FIG. 4 is a right-side view of the illustrative sound selectable game call.
Figure 5:
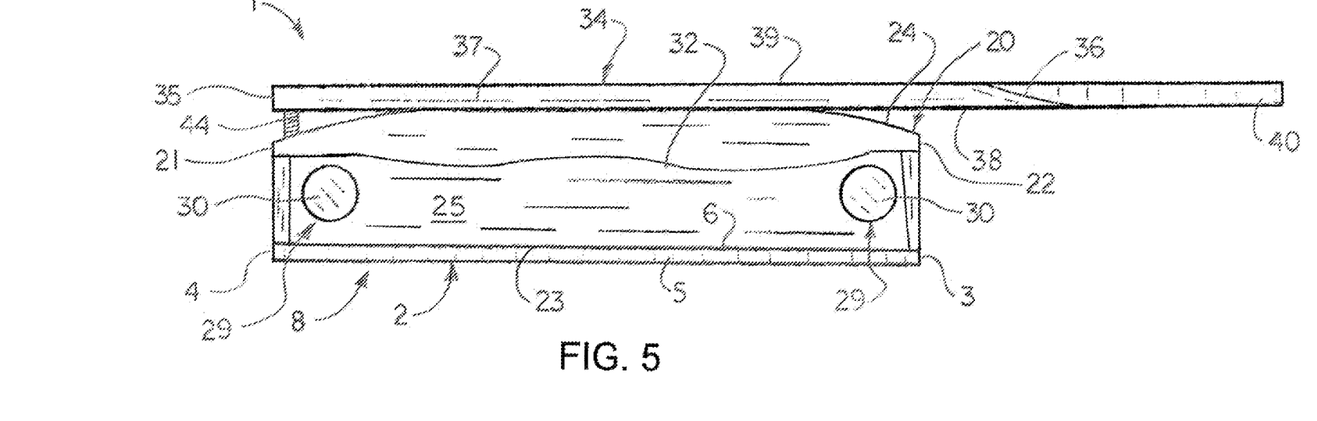
FIG. 5 is a left side view of the illustrative sound selectable game call.
Figure 6:
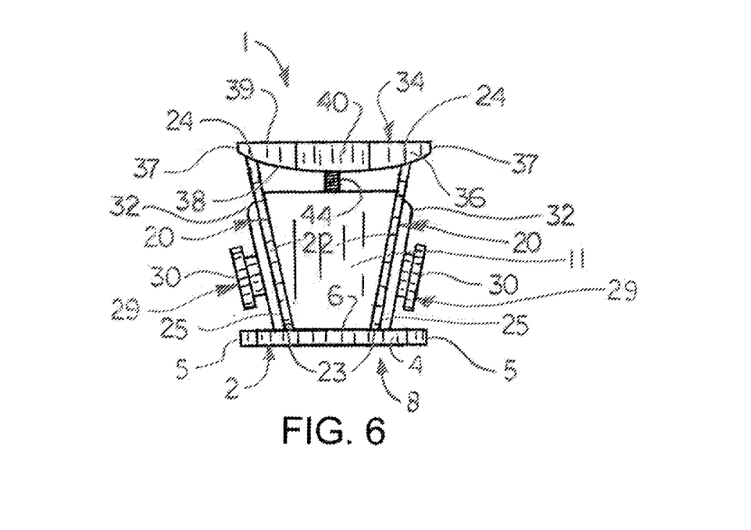
FIG. 6 is a rear view of the illustrative sound selectable game call.
Figure 7:
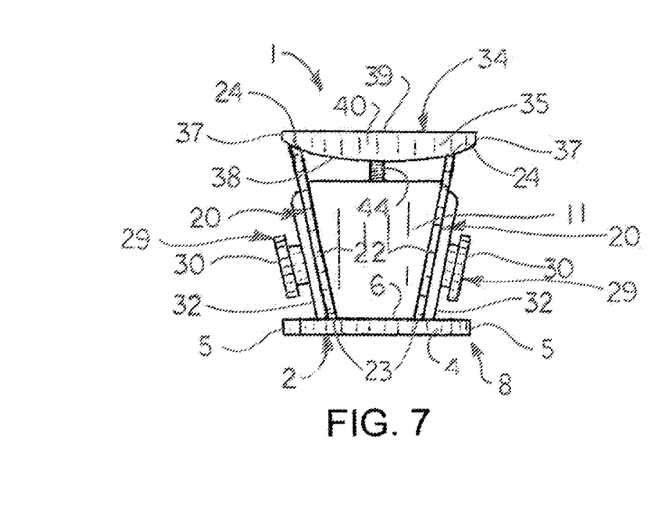
FIG. 7 is a front view of the illustrative sound selectable game call.
Figure 8:
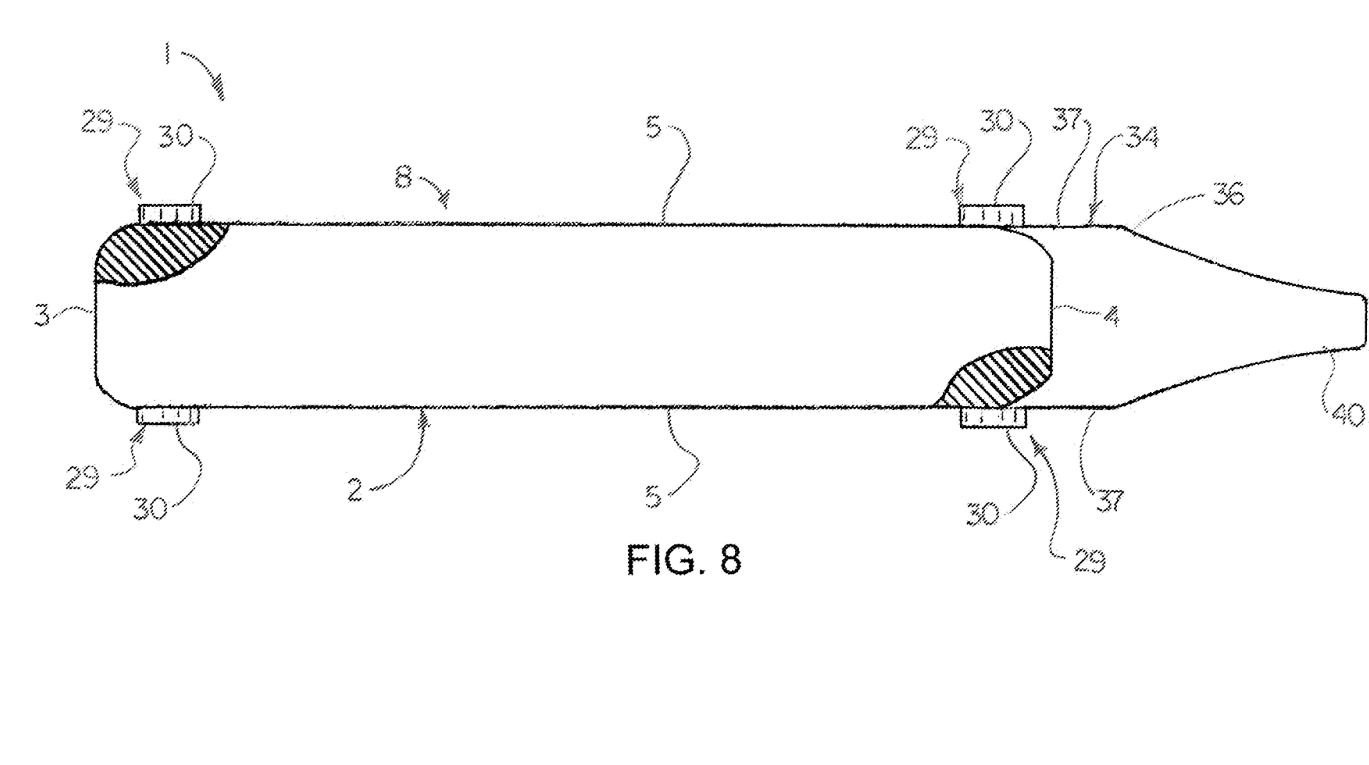
FIG. 8 is a bottom view of the illustrative sound selectable game call.

As particularly illustrated in FIGS. 1-3, the call paddle 34 may be elongated with a front paddle end 35; a rear paddle end 36; a pair of elongated, parallel, spaced-apart side paddle edges 37; a lower paddle surface 38; and an upper paddle surface 39. As illustrated in FIG. 1, in some embodiments, the lower paddle surface 38 may have a convex curvature between the side paddle edges 37. A paddle handle 40 may extend from the rear paddle end 36.

The call paddle 34 may be pivotally attached to the call frame 8 using any attachment technique which is suitable for the purpose. Accordingly, as illustrated in FIG. 2, in some embodiments, a paddle screw 44 may extend through a paddle screw opening 42 in the call paddle 34 at the front paddle end 35 and threaded into a registering paddle screw cavity 14 in the front frame wall 10 of the call frame 8.

The call frame 8 and the call paddle 34 of the sound selectable game call 1 may be fabricated of materials which are generally known in the art as suitable for making turkey box calls. In some embodiments, the frame base 2, the front frame wall 10, the rear frame wall 11, the frame spacer 12, the side frame panels 20 and/or the veneer panel 32 of the call frame 8 may be fabricated of a soft wood whereas the call paddle 34 may be fabricated of a harder wood typically having a straight grain. Woods which may be suitable for fabricating the call frame 8 may include but are not limited to Poplar, Butternut, Mahogany, Walnut, Cherry, Cedar and Sassafras. Woods which may be suitable for the call paddle 34 may include but are not limited to Maple, Walnut, Cherry, Purple heart, Zebra wood, Osage and Yellow heart.

Figure 13:
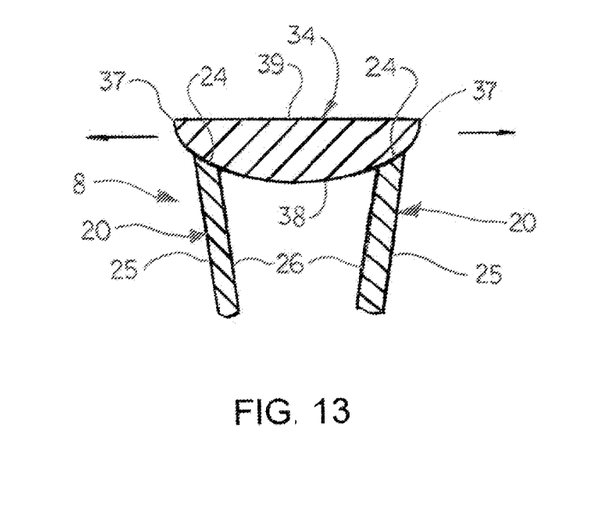
FIG. 13 is an enlarged cross-sectional view, also taken along section lines 12-12 in FIG. 3, with the call paddle disposed in contact with both of the side frame panels of the call frame as the call paddle is moved transversely across the side frame panels to produce the game call sounds.
Figure 14:
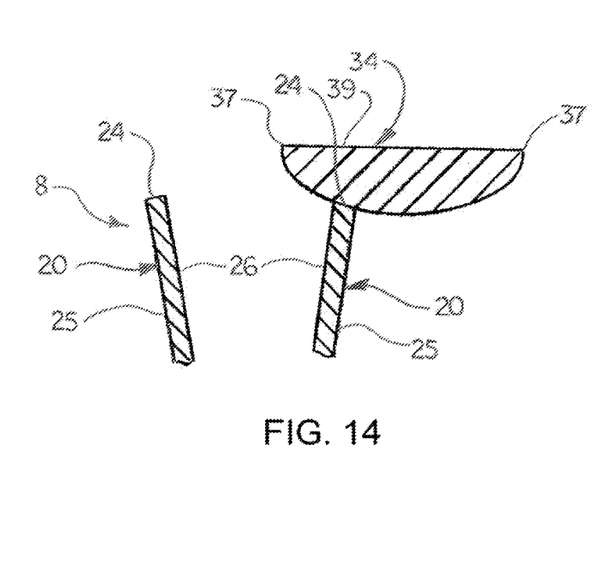
FIG. 14 is an enlarged cross-sectional view, taken along section lines 12-12 in FIG. 3, with the call paddle disposed out of contact with one of the side frame panels and in contact with the other side frame panel of the call frame as the call paddle is moved transversely across the side frame panels to produce the game call sounds.

In typical application, the sound selectable game call 1 may be operated to produce game call sounds to attract turkeys and/or other wild game for hunting, observational and/or other purposes. Accordingly, a user (not illustrated) may cradle the frame base 2 in one hand and grasp the paddle handle 40 of the call paddle 34 while repeatedly pivoting the call paddle 34 in a single direction or a back-and-forth motion about the paddle screw 44 with the other hand. As the call paddle 34 is pivoted, pressure may be applied against the call paddle 34 to press the lower paddle surface 38 against the upper panel edges 24 of the side frame panels 20 of the call frame 8. As illustrated in FIGS. 13 and 14, the resulting scraping movement across the side frame panels 20 produces the game call sounds which may attract the wild game to the user.

The pitch, tone, quality and/or other characteristics of the game call sounds which are produced by the sound selectable game call 1 may be varied considerably by adjusting the physical contact engagement tension of one or both of the side frame panels 20 against the frame spacer 12 and/or the spacer spring 18. Accordingly, in a loose adjustment of the panel tension adjustment mechanism 29 as illustrated in FIG. 16, the side frame panel 20 may be disposed in the spring configuration and at least partially disengage the frame spacer 12, with a panel gap 31 between at least a portion or segment of the side frame panel 20 and the frame spacer 12. This adjustment setting may generate game call sounds which are relatively lower in pitch. In a medium adjustment of the panel tension adjustment mechanism 29, as illustrated in FIG. 16, the panel gap 31 may shorten and/or narrow to produce game call sounds having a higher pitch. In a tight adjustment of the panel tension adjustment mechanism 29, as illustrated in FIGS. 10 and 11, the panel gap 31 may be substantially reduced or eliminated as the side frame panel 20 may engage substantially the entire surface of the frame spacer 12 to produce game call sounds having a higher pitch. Each panel tension adjustment mechanism 29 may be adjusted along a continuum to generate the game call sounds having the selected pitch, tone, quality and/or other characteristics. Moreover, selected panel tension adjustment mechanisms 29 on each corresponding side frame panel 20 may be adjusted to various tightness to achieve varying engagement tension of each side frame panel 20 against the frame spacer 12 and/or the spacer spring 18 to produce game call sounds having a wide variety of pitch, tone, quality and/or other characteristics.

In some embodiments, the spacer spring 18 may apply biasing spring pressure against the inner panel surface 26 of each corresponding side frame panel 20, opposite in direction to the engagement tension applied by the panel tension adjustment mechanism or mechanisms 29 against the side frame panel or panels 20. The spring pressure applied to the side frame panel or panels 20 in combination with the engagement tension applied by the panel tension adjustment mechanism or mechanisms 29 may further enhance the quality of the call sounds produced by the sound selectable game call 1. In some applications, spacer springs 18 having different tensions may be interchangeably disposed in the spring opening 16 to facilitate selection of a spacer spring 18 having the desired tension for a particular pitch, tone, quality and/or other characteristics of the game call sounds produced by the sound selectable game call 1.

Referring again to FIG. 2 of the drawings, it will be appreciated by those skilled in the art that the frame spacer 12 may serve as a stop for one or both of the side frame panels 20 of the call frame 8. In various embodiments, one or multiple ones of the frame spacer 12 may be provided on the frame base 2 to serve as a stop for one or both of the side frame panels 20. The multiple frame spacers 12 may be provided in adjacently touching relationship to each other or in spaced-apart relationship to each other on the upper base surface 6 of the frame base 2.

It will be further appreciated by those skilled in the art that the sound selectable game call 1 facilitates easier operation as compared to the standard or conventional box call. For example, the call paddle 34 may require significantly less pressure for application to the lower paddle surface 38 of the call paddle 34 than the standard or conventional box call. The typically removable side frame panels 20 and/or the inwardly bowed configuration of the side frame panels 20 may allow for enhanced vibration in the side frame panels 20. Moreover, in some applications, the side frame panels 20 may be removed from the call frame 8 and interchanged with other side frame panels 20 of different materials to provide additional variability in the range of game call sounds. For example and without limitation, side frame panels 20 of various materials, thicknesses, densities and/or other characteristics may be made available for purchase and interchangeably attached to the call frame 8 to provide a wide range of call sounds which can be made using the sound selectable game call 1. In some embodiments, this interchangeable attachment of the side frame panels 20 to the call frame 8 may be accomplished by removing the thumb screws 30; detaching the side frame panels 20 from the front frame wall 10 and the rear frame wall 11; and attaching the replacement side frame panels 20 to the frame walls 10, 11.

While certain illustrative embodiments of the disclosure have been described above, it will be recognized and understood that various modifications can be made to the embodiments and the appended claims are intended to cover all such modifications which may fall within the spirit and scope of the disclosure.

I claim:

1. A sound selectable game call, comprising:
 a call frame comprising:
  a first frame wall;
  a second frame wall;
  a first side frame panel carried by the first frame wall and the second frame wall;

a second side frame panel carried by the first frame wall and the second frame wall and disposed adjacent and spaced-apart with respect to the first side frame panel, at least one of the first side frame panel and the second side frame panel detachable and removable with respect to the first frame wall and the second frame wall;
at least one frame spacer disposed between the first frame wall and the second frame wall and between the first side frame panel and the second side frame panel, the at least one of the first side frame panel and the second side frame panel engageable in physical contact with the at least one frame spacer; and
at least one panel tension adjustment mechanism engaging the at least one of the first side frame panel and the second side frame panel, the at least one panel tension adjustment mechanism configured to adjust engagement tension of the at least one of the first side frame panel and the second side frame panel against and in physical contact engagement with the at least one frame spacer; and
a call paddle pivotally carried by the call frame, the call paddle configured for contact with and scraping movement across the at least one of the first side frame panel and the second side frame panel for production of game call sounds.

2. The sound selectable game call of claim 1 wherein the first side frame panel and the second side frame panel engage the at least one frame spacer, and the at least one panel tension adjustment mechanism comprises a first panel tension adjustment mechanism engaging the first side frame panel and configured to adjust the engagement tension of the first side frame panel against the at least one frame spacer, and a second panel tension adjustment mechanism engaging the second side frame panel and configured to adjust the engagement tension of the second side frame panel against the at least one frame spacer.

3. The sound selectable game call of claim 1 wherein the at least one panel tension adjustment mechanism comprises at least one thumb screw.

4. The sound selectable game call of claim 1 wherein the at least one thumb screw comprises a plurality of thumb screws.

5. The sound selectable game call of claim 1 wherein the at least one of the first side frame panel and the second side frame panel is normally bowed inwardly with respect to the at least one frame spacer.

6. The sound selectable game call of claim 1 wherein each of the first side frame panel and the second side frame panel comprises a front panel edge, a rear panel edge and a lower panel edge and an upper panel edge extending between the front panel edge and the rear panel edge, and the call paddle is configured for contact with and scraping movement across the upper panel edge of the at least one of the first side frame panel and the second side frame panel for production of the game call sounds.

7. The sound selectable game call of claim 6 wherein the upper panel edge of the at least one of the first side frame panel and the second side frame panel is convex.

8. A sound selectable game call, comprising:
a call frame comprising:
a first side frame panel;
a second side frame panel disposed adjacent and spaced-apart with respect to the first side frame panel;
at least one frame spacer disposed between the first side frame panel and the second side frame panel, at least one of the first side frame panel and the second side frame panel engaging the at least one frame spacer;
at least one spring opening in the at least one frame spacer and at least one spacer spring in the at least one spring opening, and wherein the at least one of the first side frame panel and the second side frame panel engages the at least one spacer spring;
at least one panel tension adjustment mechanism engaging the at least one of the first side frame panel and the second side frame panel, the at least one panel tension adjustment mechanism configured to adjust engagement tension of the at least one of the first side frame panel and the second side frame panel against the at least one frame spacer; and
a call paddle pivotally carried by the call frame, the call paddle configured for contact with and scraping movement across the at least one of the first side frame panel and the second side frame panel for production of game call sounds.

9. A sound selectable game call, comprising:
a call frame comprising:
a frame base;
a first frame wall carried by the frame base;
a second frame wall carried by the frame base;
at least one frame spacer carried by the frame base between the first frame wall and the second frame wall;
a first side frame panel detachably and removably carried by the first frame wall and the second frame wall, the first side frame panel engageable in physical contact with the at least one frame spacer;
a second side frame panel detachably and removably carried by the first frame wall and the second frame wall, the second side panel disposed adjacent and spaced-apart with respect to the first side frame panel and engageable in physical contact with the at least one frame spacer, whereby removability of the first side frame panel and the second side frame panel with respect to the first frame wall and the second frame wall enhance vibration of the first side frame panel and the second side frame panel and enhance tunability of the sound selectable game call; and
at least one panel tension adjustment mechanism engaging at least one of the first side frame panel and the second side frame panel, the at least one panel tension adjustment mechanism configured to adjust engagement tension of the at least one of the first side frame panel and the second side frame panel against and in physical contact engagement with the at least one frame spacer; and
a call paddle pivotally carried by the call frame, the call paddle configured for contact with and scraping movement across the at least one of the first side frame panel and the second side frame panel for production of game call sounds.

10. The sound selectable game call of claim 9 wherein the at least one panel tension adjustment mechanism comprises a first panel tension adjustment mechanism engaging the first side frame panel and configured to adjust the engagement tension of the first side frame panel against the at least one frame spacer, and a second panel tension adjustment mechanism engaging the second side frame panel and configured to adjust the engagement tension of the second side frame panel against the at least one frame spacer.

11. The sound selectable game call of claim 9 wherein the at least one panel tension adjustment mechanism comprises at least one thumb screw.

12. The sound selectable game call of claim 9 wherein the at least one panel tension adjustment mechanism comprises a plurality of panel tension adjustment mechanisms detachably securing the at least one of the first side frame panel and the second side frame panel to the first frame wall and the second frame wall, respectively.

13. The sound selectable game call of claim 9 further comprising at least one spring opening in the at least one frame spacer and at least one spacer spring in the at least one spring opening, and wherein the at least one of the first side frame panel and the second side frame panel engages the at least one spacer spring.

14. The sound selectable game call of claim 9 wherein the at least one of the first side frame panel and the second side frame panel is normally bowed inwardly with respect to the at least one frame spacer.

15. The sound selectable game call of claim 9 wherein each of the first side frame panel and the second side frame panel comprises a front panel edge, a rear panel edge and a lower panel edge and an upper panel edge extending between the front panel edge and the rear panel edge, and the call paddle is configured for contact with and scraping movement across the upper panel edge of the at least one of the first side frame panel and the second side frame panel for production of the game call sounds.

16. The sound selectable game call of claim 15 wherein the upper panel edge of the at least one of the first side frame panel and the second side frame panel is convex.

17. A sound selectable game call, comprising:
a call frame comprising:
a frame base having a first base end and a second base end;
a first frame wall at the first base end of the frame base;
a second frame wall at the second base end of the frame wall;
a frame spacer carried by the frame base between the first base end and the second base end;
a first side frame panel detachably carried by the first frame wall and the second frame wall;
a second side frame panel detachably carried by the first frame wall and the second frame wall, the second side frame panel disposed adjacent and spaced-apart with respect to the first side frame panel;
wherein the first side frame panel and the second side frame panel are normally bowed inwardly with respect to the frame spacer;
at least one spring opening in the frame spacer;
at least one spacer spring in the at least one spring opening, the first side frame panel and the second side frame panel engaging the at least one spacer spring;
a first panel tension adjustment mechanism engaging and detachably securing the first side frame panel against the at least one spacer spring, the first panel tension adjustment mechanism configured to adjust engagement tension of the first side frame panel against the at least one spacer spring and the frame spacer; and
a second panel tension adjustment mechanism engaging and detachably securing the second side frame panel against the at least one spacer spring, the second panel tension adjustment mechanism configured to adjust engagement tension of the second side frame panel against the at least one spacer spring and the frame spacer; and
a call paddle pivotally carried by the call frame, the call paddle configured for contact with and scraping movement across the first side frame panel and the second side frame panel for production of game call sounds.

18. The sound selectable game call of claim 17 wherein the first panel tension adjustment mechanism comprises a first plurality of thumb screws and the second panel tension adjustment mechanism comprises a second plurality of thumb screws.

19. The sound selectable game call of claim 17 wherein each of the first side frame panel and the second side frame panel comprises a front panel edge, a rear panel edge and a lower panel edge and an upper panel edge extending between the front panel edge and the rear panel edge, and the call paddle is configured for contact with and scraping movement across the upper panel edge of the at least one of the first side frame panel and the second side frame panel for production of the game call sounds.

20. The sound selectable game call of claim 19 wherein the upper panel edge of each of the first side frame panel and the second side frame panel is convex.

* * * * *